(12) United States Patent
Trummer et al.

(10) Patent No.: US 9,696,413 B2
(45) Date of Patent: Jul. 4, 2017

(54) METHOD FOR ALIGNING A LASER SCANNER WITH RESPECT TO A ROADWAY

(71) Applicant: JENOPTIK Robot GmbH, Monheim (DE)

(72) Inventors: Michael Trummer, Hildesheim (DE);
Michael Lehning, Hildesheim (DE);
Marcos Michaelsen, Langenfeld (DE);
Marko Ortner, Monheim (DE)

(73) Assignee: Jenoptik Robot GmbH, Monheim (DE)

( * ) Notice: Subject to any disclaimer, the term of this patent is extended or adjusted under 35 U.S.C. 154(b) by 412 days.

(21) Appl. No.: 14/581,496

(22) Filed: Dec. 23, 2014

(65) Prior Publication Data

US 2015/0177370 A1 Jun. 25, 2015

(30) Foreign Application Priority Data

Dec. 23, 2013 (DE) .................. 10 2013 114 821

(51) Int. Cl.
*G01C 3/08* (2006.01)
*G01S 7/497* (2006.01)
*G01S 17/02* (2006.01)
*G01S 17/42* (2006.01)
*G01S 17/58* (2006.01)
*G01S 17/88* (2006.01)
*G01S 7/51* (2006.01)

(52) U.S. Cl.
CPC .............. *G01S 7/4972* (2013.01); *G01S 7/51* (2013.01); *G01S 17/023* (2013.01); *G01S 17/42* (2013.01); *G01S 17/58* (2013.01); *G01S 17/88* (2013.01)

(58) Field of Classification Search
CPC ........ G01S 17/023; G01S 17/42; G01S 17/88; G01S 17/58; G01S 7/51; G01S 7/4972
USPC ......................................................... 356/5.01
See application file for complete search history.

(56) References Cited

U.S. PATENT DOCUMENTS

| | | | | |
|---|---|---|---|---|
| 7,898,569 B2* | 3/2011 | Koselka | ............ | H04N 13/0239 348/139 |
| 8,340,356 B2* | 12/2012 | Lehning | ................ | G01S 7/4972 356/27 |
| 2013/0151135 A1* | 6/2013 | Aubrey | .................... | G08G 1/00 701/118 |

(Continued)

FOREIGN PATENT DOCUMENTS

| | | |
|---|---|---|
| DE | 199 02 287 A1 | 7/2000 |
| DE | 101 54 861 A1 | 5/2003 |

(Continued)

*Primary Examiner* — Mark Hellner
(74) *Attorney, Agent, or Firm* — Muncy, Geissler, Olds & Lowe, P.C.

(57) ABSTRACT

A method for aligning a measuring device installed alongside a roadway at an unknown installation height, the measuring device including a laser scanner, a camera and a display. A camera image generated by the camera is inserted into the display and superimposed by a road model, formed from a multiplicity of straight lines running towards an intersection point. The measuring device is subsequently rotated and tilted, as a result of which the camera image is rotated and shifted on the display, until the images of the roadway margins and edges running parallel thereto are in alignment at the intersection point.

6 Claims, 7 Drawing Sheets

(56) References Cited

U.S. PATENT DOCUMENTS

2017/0011625 A1* 1/2017 Stelzig ................ G08G 1/0116

FOREIGN PATENT DOCUMENTS

| DE | 10 2011 050 659 B3 | 1/2013 |
|----|--------------------|--------|
| EP | 2 234 081 A2 | 9/2010 |
| EP | 2 105 761 B1 | 10/2012 |
| EP | 2 527 872 A1 | 11/2012 |
| EP | 2 528 048 A2 | 11/2012 |

* cited by examiner

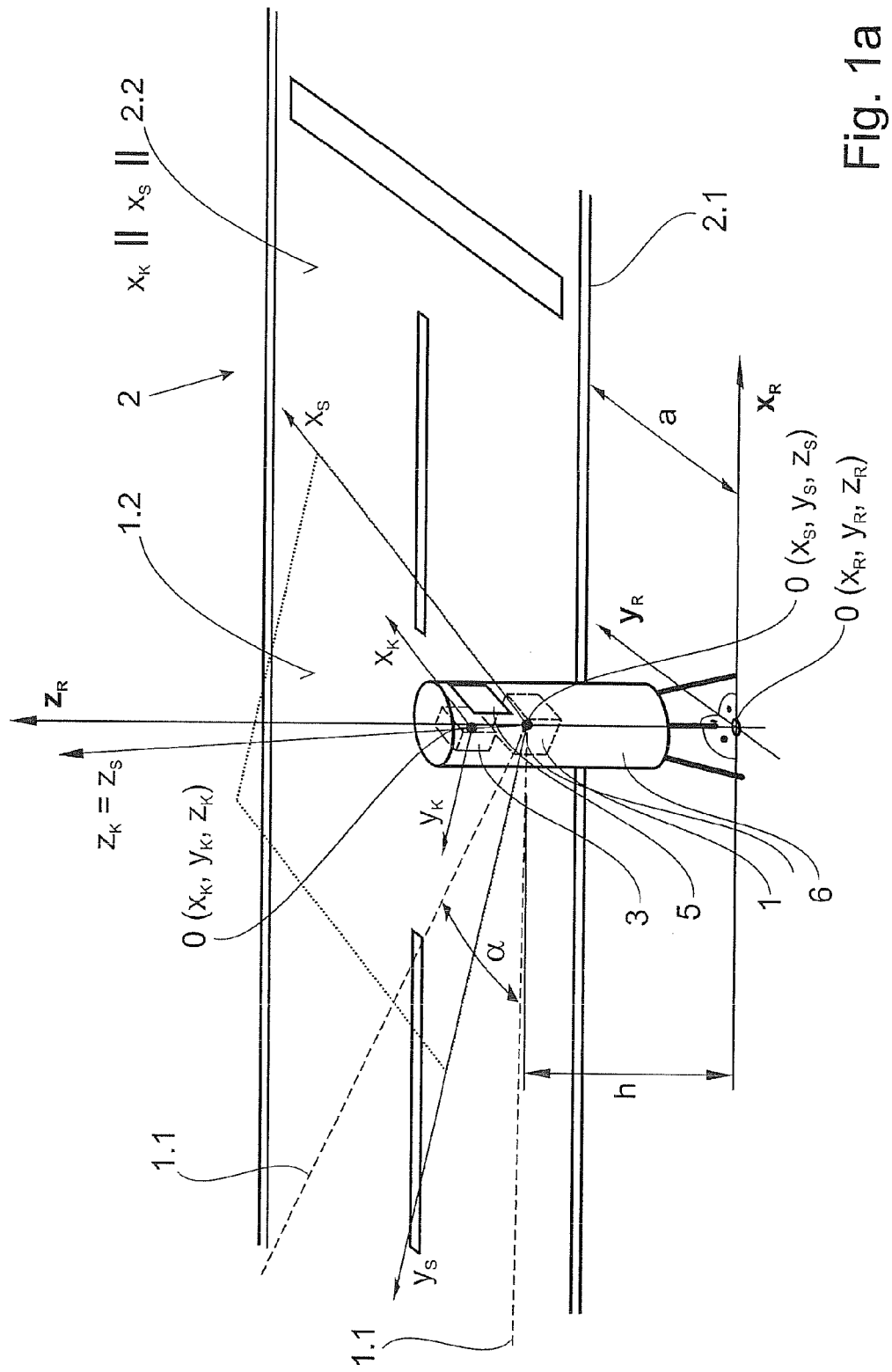

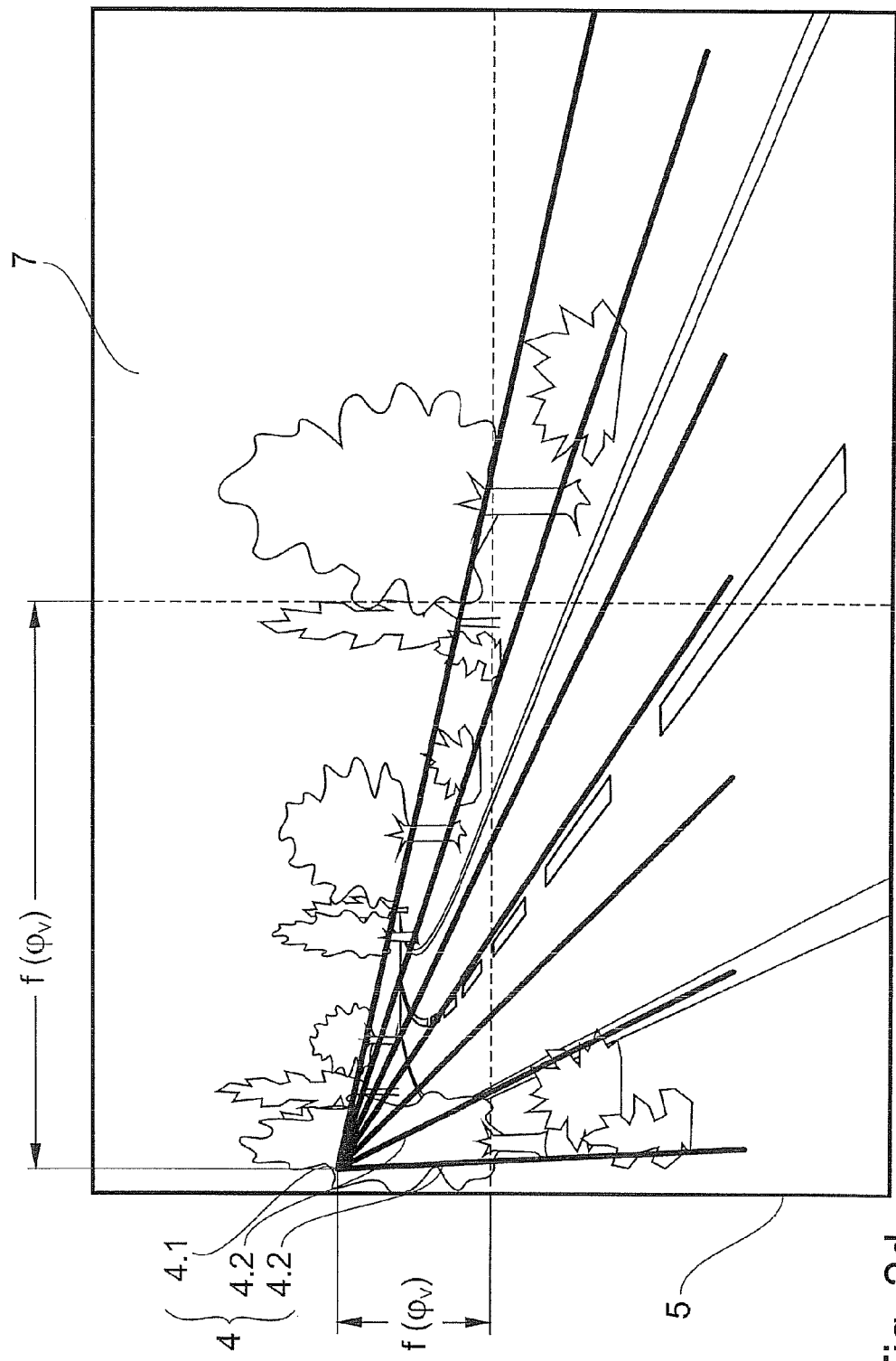

METHOD FOR ALIGNING A LASER SCANNER WITH RESPECT TO A ROADWAY

This nonprovisional application claims priority to German Patent Application No. DE 10 2013 114. 821.2, which was filed in Germany on Dec. 23, 2013, and which is herein incorporated by reference.

BACKGROUND OF THE INVENTION

Field of the Invention

The invention relates to a method by which a measurement range of a laser scanner which is installed alongside a roadway and which is fixedly connected to a camera can be aligned with respect to the roadway surface.

Description of the Background Art

With the use of non-contact measuring devices for traffic measurements it is important for the profile of the measurement radiation and thus the position of the measurement range relative to the position of the roadway to be defined in a predetermined manner.

This applies to laser scanners, in particular, in which the measurement range is determined by a scanning angle range within which a laser beam is deflected, relative to a centre axis bisecting the scanning angle range, about an axis orthogonal to the scanning plane at the origin of the scanning angle range. Disregarding the divergence of the laser beam, the measurement range thus constitutes a delimited plane and its spatial position is determined by the arrangement and alignment of the laser scanner with respect to the roadway relative to features of the roadway.

Assuming that only reflection signals from vehicles are obtained if the scanning plane lies in a height range of approximately 45 cm to approximately 70 cm above the roadway surface, such that the laser beam impinges on the vehicle at a height of approximately 45 cm to approximately 70 cm, that the measurement range is generally intended to cover a plurality of lanes of a roadway and a vehicle travelling through the measurement range is intended to be detected with a minimum frequency, the laser scanner, which is installed at a different installation height with respect to the roadway margin in a situation-related manner as a result of different ground heights outside the roadway, has to be aligned optimally with respect to the roadway margin and with respect to the roadway surface.

In the present description, a laser scanner can be understood to mean a complete serviceable device having a frame for temporary or permanent installation, such as is used in traffic measurement. By means of a scanner mirror that rotates or pivots about a scanning axis, a pulsed laser beam coming from a laser source is deflected, within a predefined scanning angle range, about a centre axis bisecting the scanning angle range in a scanning plane. By means of the pulse time-of-flight measurement, from the reflection signals that arise as a result of reflection of the pulsed laser beam at areas (reflection points) of vehicles travelling through the measurement range, the distance of the reflection point is ascertained. On account of the reflective areas of the vehicle, during a scan the reflection signals from a vehicle describe a pair of path sections approximately perpendicular to one another, that is to say a right angle. This right angle shifts from scan to scan as a vehicle passes through, and the speed of the vehicle to be measured is determined from the shift of the right angles.

In order to achieve a sufficient accuracy for the speed, a sufficient number of shifts of the right angles are required. For this purpose, the vehicle has to cover the distance of a minimum path section in the measurement range in order to obtain a sufficient number of scans with reflection signals per vehicle. Therefore, as already explained, the measurement range, which is formed only by a delimited plane, has to be aligned optimally with respect to the roadway surface and with respect to the roadway margin. Furthermore, the alignment of the laser scanner has to be known in order to be able to draw unambiguous conclusions about the position of the measured vehicle from the reflection signals. That is to say that the position of the pulsed laser beam has to be able to be assigned to a known vertical angle with the roadway surface and a known horizontal angle with the roadway margin at each measurement instant, in order to be able to deduce a position of the reflection point relative to the roadway from a distance value assigned to the measurement instant.

The alignment of a laser scanner with respect to a roadway can be described, in principle, by three parameters, the rolling angle, the pitching angle and the azimuth angle (yaw angle). In accordance with the prior art, the laser scanner is installed at an installation height which lies within the height range in which vehicles can be reliably detected. According to the invention, a laser scanner is also intended to be able to be installed at a greater installation height. For this purpose, a pitching angle is set depending on the installation height. The rolling angle is intended always to be equal to zero.

The rolling angle can describe the inclination of the scanning plane relative to the roadway surface, which is understood as a plane. The rolling angle is equal to zero or is eliminated if a laser scanner longitudinal axis of a laser scanner coordinate system defined by the laser scanner lies in a plane parallel to the roadway surface. The rolling angle can also be explained as the angle formed between the centre axis of the laser scanner and a perpendicular—positioned into the scanning plane—to a straight line of intersection formed between the roadway surface and the scanning plane. That is to say that the rolling angle is equal to zero or eliminated if said straight line of intersection is orthogonal to the centre axis.

The pitching angle is the angle formed between the centre axis and the roadway surface, strictly speaking the longitudinal direction of the roadway surface. In general, a pitching angle of zero is set if the installation height is between 45 and 65 cm. A greater pitching angle is chosen at a greater installation height.

The azimuth angle is the angle formed between the centre axis and the roadway margin. An expedient azimuth angle is e.g. 22°.

The installation distance is the perpendicular distance between the measuring device and the roadway margin.

The installation height is the perpendicular distance from the intersection point between scanner longitudinal axis and centre axis to the roadway surface. To put it in simpler terms, it is the height at which the laser beam leaves the laser scanner relative to the roadway surface.

In order to be able to compare a method according to the invention with those according to the prior art more simply, the terms defined above are used for this purpose.

DE 199 02 287 A1 describes an automatic method for aligning a scanning plane of a laser scanner mounted on a vehicle with respect to a roadway surface, which method makes use of the fact that a plane can be defined by only three points. This presupposes that the installation height (in that case the height of the transmitter of the laser scanner) relative to the roadway is known. For aligning the scanning plane with respect to the roadway surface, two well-defined bodies are arranged in the scanning range, which reflect a defined value of radiation at a predetermined height, depending on the desired pitching angle (in that case inclination angle), between the scanning plane and the roadway. In the case where an inclination angle of 0° is intended to be set, that is to say that the scanning plane is intended to be aligned parallel to the roadway plane, the body reflects the defined value at the known height of the transmitter of the laser scanner. The position of the transmitter is adjusted until the radiation reflected by the body has the defined value. This method step is then repeated with the other body, as a result of which the rolling angle is set to zero and the position of the scanning plane is defined.

The method is provided for automatically adjusting a laser scanner on an automobile. For a use for aligning a laser scanner installed alongside a roadway, what is disadvantageous about this method, in particular, is that, for aligning the scanning plane, firstly the height of the transmitter relative to the roadway has to be known and secondly, with the two well-defined bodies, special aids are required, the arrangement and measurement of which are difficult in moving traffic. Furthermore, the position of the scanning angle range cannot be set up using this method.

In accordance with a method in the patent specification EP 2 105 761 B1, the scanning plane of a laser scanner can be aligned parallel to a roadway surface without the installation height (in that case the height of the transmitter of the laser scanner) being known. The alignment is effected exclusively by the ascertainment of distance values and presupposes the definition of a rectangular Cartesian spatial coordinate system (in that case roadway coordinate system) and a rectangular Cartesian scanner coordinate system.

The spatial coordinate system can be formed by a roadway longitudinal axis, which runs in the direction of travel parallel to the course of a roadway margin, a roadway transverse axis, which lies with the roadway longitudinal axis in the roadway surface assumed to be a plane, and a normal axis relative to the roadway surface, said normal axis running in the direction of a surface normal.

The installed laser scanner and the thus predefined spatial position of the scanner mirror and also the emission plane of the laser beam reflected by the scanner mirror, which plane constitutes the scanning plane, define the scanner coordinate system. It is determined by a scanning axis, about which the scanner mirror is rotated or pivoted, a centre axis, which bisects the scanning angle range of the laser scanner, and a scanner longitudinal axis, which together with the centre axis spans the scanning plane.

The impingement point of the laser beam on the scanner mirror and thus on the optical axis of a laser that emits the laser beam forms the coordinate origin of the scanner coordinate system.

The coordinate origin of the spatial coordinate system is positioned at a point of intersection of a surface normal—imagined through the coordinate origin of the scanner coordinate system—of the roadway surface through the roadway surface.

The distance between the coordinate origin of the scanner coordinate system and the coordinate origin of the spatial coordinate system defines the installation height.

After the empirical installment of the laser scanner alongside the roadway, the scanning plane is inclined with respect to the roadway plane by a random rolling angle (in that case longitudinal inclination angle) and a random pitching angle (in that case transverse inclination angle) relative to the roadway plane. The centre axis (in that case scanner transverse axis) forms a random azimuth angle with the roadway margin. The random rolling angle and the random pitching angle are small and the random azimuth angle deviates only slightly from 90°.

For aligning the laser scanner, subsequently three method steps, in each case with the aid of measured distance values, involve firstly the random rolling angle being eliminated by the parallel alignment of the scanner longitudinal axis with respect to the roadway longitudinal axis, then the random pitching angle being eliminated by the parallel alignment of the scanning axis with respect to the surface normal of the roadway surface and, finally, the installation height being ascertained as required.

The method for aligning a laser scanner with respect to a roadway in accordance with EP 2 105 761 B1 cited above is concluded once the scanning plane has been aligned parallel to the roadway surface.

This method presupposes that a horizontal alignment of the scanning plane with respect to the roadway is the correct alignment in order to achieve an optimum measurement range.

In practice, however, the installation conditions are highly diverse particularly for mobile measurement devices comprising a laser scanner which are intended to be installed only temporarily, with the result that a horizontal alignment is not always optimal.

Mobile laser scanners, in particular, are intended to be able to be rapidly installed and aligned in an inconspicuous manner and in a manner integrated as much as possible in their environment, often behind a natural concealing screen or a crash barrier as viewed from the roadway. In order to ensure that the laser scanner has an unrestricted view of the roadway despite viewing impediments, it may be of interest to be able to install the laser scanner in a manner such that it is variable in terms of its installation height and thus adaptable to the ambient situation. A different installation height can also arise in an undesired manner from a height difference between the ground surface and the roadway surface.

With increasing installation height, the situation can then arise that reliable measurement is no longer ensured in the case of a horizontal alignment of the scanning plane, such that, in order to arrive at an optimum measurement range, a pitching angle dependent on the installation height has to be set, as a result of which the scanning plane forms a corresponding angle of less than 90° with the roadway surface. The installation distance should also be taken into account for setting a pitching angle of greater than 0°. If said installation distance is always the same within specific tolerances, said installation distance can already be taken into consideration when the dependent pitching angle is generated. Otherwise, predefined pitching angles are stored, which are in each case assigned to an installation height or a tolerance range around the latter and to an installation distance or a tolerance range around the latter.

Although it should not pose a problem for the person skilled in the art to tilt a laser scanner aligned in accordance with EP 2 105 761 B1 cited above by a predefined pitching angle dependent on the installation height, EP 2 105 761 B1 cited above does not give any suggestion in this respect. The installation height is ascertained there possibly only in order to know at what height passing vehicles are measured.

Furthermore, said method does not disclose or suggest aligning the laser scanner at an acute azimuth angle formed between the centre axis and the roadway margin.

At all events, the setting of a pitching angle of not equal to 0° and an acute azimuth angle would require additional method steps, the sequences of which can be neither gathered nor derived from EP 2 105 761 B1 cited above.

DE 10 2011 050 659 B4 cited above discloses a method for aligning a traffic monitoring device, wherein a camera fixedly connected to a measuring sensor of the traffic monitoring device is used to create a plurality of successive images of vehicles travelling through the object region of the camera. An actual horizon line is ascertained in the images on the basis of calculated vanishing points of imaged parallel body edges. The camera is subsequently rotated until said actual horizon line coincides with a desired horizon line which divides the image transversely into two image parts of equal height. The receiver matrix of the camera is then aligned with respect to the desired horizon line, that is to say that the rows of the receiver matrix run parallel to the horizon and thus parallel to the roadway surface. By virtue of the fact that the camera is fixedly connected to a measuring device, a measuring device can also be aligned horizontally by means of this method.

If the measuring device is a laser scanner, by means of this method the rolling angle can be set to zero or eliminated and a predefined pitching angle can be set. A pitching angle dependent on an installation height of the laser scanner cannot be set if said height is not known. Moreover, azimuth angles cannot be set by means of this method.

SUMMARY OF THE INVENTION

It is therefore an object of the invention to provide a novel method which can be used to align a laser scanner at a pitching angle, dependent on its unknown installation height, relative to the roadway surface and at a predefined acute azimuth angle with respect to the roadway margin with little complexity.

This object is achieved by means of a method for aligning a measuring device installed alongside a roadway at an unknown installation height, said measuring device comprising a laser scanner, a camera fixedly assigned to the latter in a defined manner and a display, with respect to the roadway. A generic type is known from DE 10 2011 050 659, which is incorporated herein by reference.

The laser scanner defines a Cartesian rectangular scanner coordinate system having a scanning axis, a scanner longitudinal axis and a centre axis.

The camera defines a Cartesian rectangular camera coordinate system having a row axis, an optical axis and a column axis.

The row axis is aligned parallel to the scanner longitudinal axis, the optical axis is aligned parallel to the centre axis, and the column axis is aligned in alignment with the scanning axis.

The distance between the coordinate origin of the camera coordinate system and the coordinate origin of the scanner coordinate system is very small in relation to the distance between the edges imaged in the camera image and the measuring device, for which reason both coordinate systems can be understood as one in terms of computation.

The measuring device is installed with respect to the roadway such that the scanner longitudinal axis lies in a plane parallel to a roadway surface of the roadway, as a result of which a pitching angle formed between the measuring device and the roadway surface is equal to zero.

The method for aligning the measuring device then proceeds as follows.

A camera image from the camera is visualized on the display and a road model is projected onto the display. The road model is formed by a multiplicity of straight lines running towards an intersection point, wherein the intersection point coincides with the natural vanishing point of images of a roadway margin of the roadway and edges parallel thereto if the measuring device is aligned with respect to the roadway such that the centre axis forms a predefined azimuth angle with the roadway margin and a predefined pitching angle with the roadway surface, wherein the predefined pitching angle has a magnitude such that the centre axis impinges on the roadway surface. The road model need not itself comprise the intersection point. Subsequently, the measuring device is inclined about the scanning axis and the scanner longitudinal axis, as a result of which the camera image rotates and shifts on the display, until the images of the roadway margin and edges parallel thereto are in alignment at the intersection point. As a result, the centre axis forms the predefined azimuth angle with the roadway margin and the predefined pitching angle with the roadway surface.

A laser beam is emitted by the laser scanner and the distance between an impingement point of the laser beam on the roadway surface and the measuring device is calculated by means of a pulse time-of-flight measurement.

The installation height is calculated from the calculated distance and the predefined pitching angle, and, for the calculated installation height, a previously ascertained optimum pitching angle dependent on the installation height is selected.

The road model is subsequently shifted on the display, wherein the intersection point coincides with the natural vanishing point of the images of the roadway margin and of the edges parallel thereto if the measuring device is aligned with respect to the roadway such that the centre axis forms the predefined azimuth angle with the roadway margin and the selected dependent pitching angle with the roadway surface.

Finally, the measuring device is inclined about the scanner longitudinal axis, as a result of which the camera image shifts on the display, until the images of the roadway margin and of the edges parallel thereto are in alignment at the intersection point. As a result, the centre axis still forms the predefined azimuth angle with the roadway margin and the selected dependent pitching angle with the roadway surface, as a result of which the measuring device is set up to completion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The definitions of a rectangular Cartesian spatial coordinate system and a rectangular Cartesian scanner coordinate system, as known from EP 2 105 761 B1 cited above, are incorporated herein by reference.

Figure 1C:
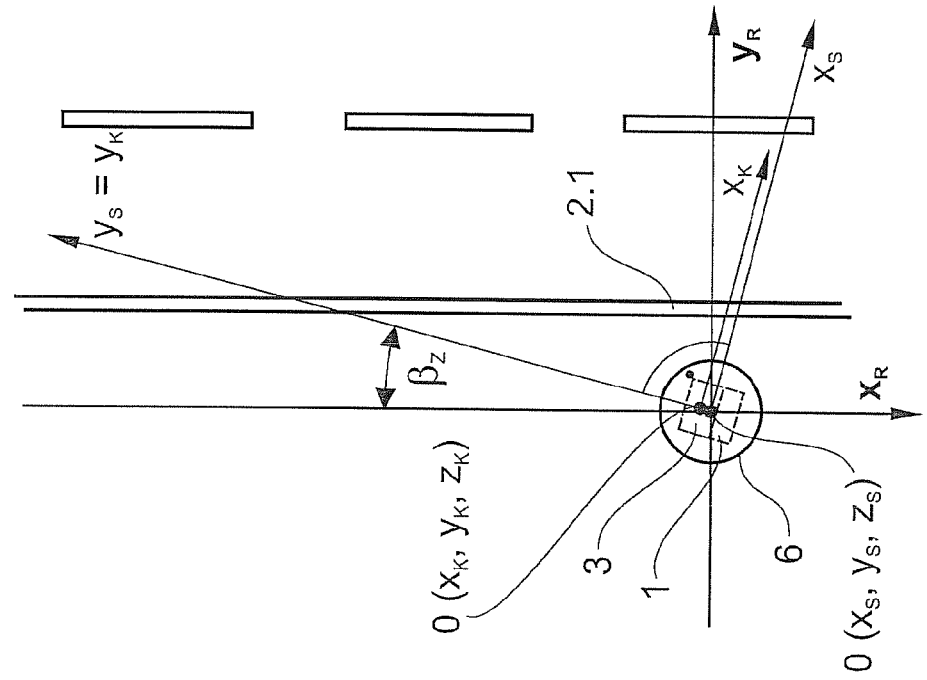
FIG. 1a shows a perspective view of a measuring device arranged and preadjusted with respect to the roadway.
FIG. 1b shows a side view of a measuring device arranged in accordance with FIG. 1a, FIG. 1c shows a plan view of a measuring device arranged in accordance with FIG. 1a, FIG. 1d shows a display with a representation of a camera recording with a measuring device arranged in accordance with FIG. 1a, superimposed by a road model in a first relative position.
Figure 1B:
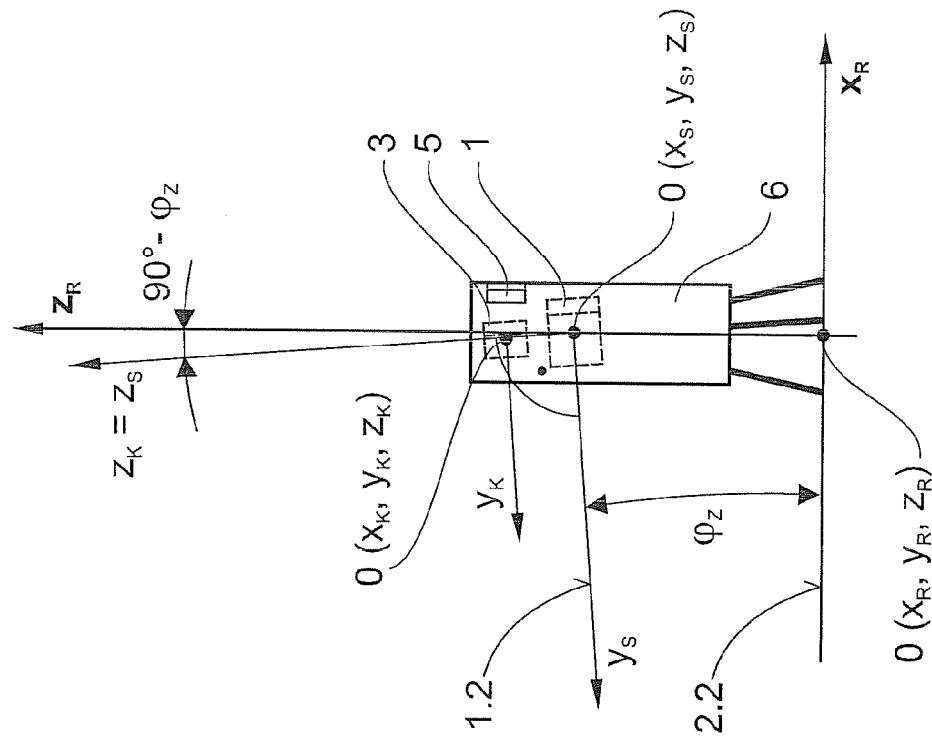

FIGS. 1a, 1b and 1c show a roadway 2 having a roadway margin 2.1 and a roadway surface 2.2, and a measuring device 6 comprising a laser scanner 1 and a camera 3, said measuring device being installed alongside the roadway margin 2.1.

As will be explained in greater detail at a later juncture, the measuring device 6 in this illustration is arranged in a manner such that it is already preadjusted relative to the roadway 2. The preadjustment itself is not part of the method according to the invention.

As already explained, the laser scanner 1 has a scanner mirror (not illustrated), which is rotatable about a scanning axis $z_S$, such that a pulsed laser beam that comes from a laser (not illustrated) and impinges on the scanner mirror can be deflected within a predefined scanning angle range $\alpha$. The position of the scanning angle range $\alpha$ can be defined by the position of a centre axis $y_S$ bisecting said range.

The positions of the laser beam in the end positions within the scanning angle range $\alpha$ are illustrated as marginal rays 1.1.

The scanner coordinate system is defined by the installation of the laser scanner 1 and the thus predefined spatial position of the scanning angle range $\alpha$ and the scanning axis $z_S$. The coordinate axes are given by the scanning axis $z_S$, the centre axis $y_S$ and a scanner longitudinal axis $z_S$, which runs at right angles with respect to the centre axis $y_S$ and scanning axis $z_S$ and which together with the centre axis $y_S$ spans the scanning plane 1.2. Instead of the centre axis $y_S$, one of the marginal rays 1.1 could also be defined as a coordinate axis.

For carrying out the method it is essential that the measuring device 6 comprises the camera 3 and a display 5 alongside the laser scanner 1. The camera 3 typically has a receiver matrix and a lens having an optical axis $y_K$, which is perpendicular to the receiver matrix. The optical axis $y_K$, the rows (row axis $x_K$) of the receiver matrix that intersect the optical axis $y_K$ and the columns (column axis $z_K$) of the receiver matrix that intersect the optical axis $y_K$ define a rectangular Cartesian camera coordinate system.

The laser scanner 1 and the camera 3 are arranged fixedly with a defined relative position with respect to one another, wherein the row axis $x_K$ is aligned parallel to the scanner longitudinal axis $x_S$, the optical axis $y_K$ is aligned parallel to the centre axis $y_S$, and the column axis $z_K$ is aligned in alignment with respect to the scanning axis $z_S$. The camera 3 then views in the direction of the centre axis $y_S$ and captures an object region in which the measurement range at least partly lies.

The coordinate origins of the camera coordinate system and of the scanner coordinate system are so close together that the distance between them is so small in relation to the measurement distances that it can be disregarded, and for computation purposes it can be assumed that the camera coordinate system coincides with the scanner coordinate system.

The position of an object point relative to the scanner coordinate system can then be converted in a simple manner by means of the imaging scale of the lens into the image thereof as a pixel within a recording by the camera (camera recording), and vice versa.

If this advantageous relative position of the camera coordinate system with respect to the scanner coordinate system is not provided, e.g. because the camera is intended to capture a diverse object field, the position of an object point relative to the scanner coordinate system can be converted into the position of its image in a camera recording by coordinate transformation and taking into consideration the imaging scale of the lens.

For a simple understanding of the method according to the invention, it will be assumed hereinafter that the camera coordinate system coincides with the scanner coordinate system. This simplification will accordingly be assumed in the description of the exemplary embodiment and the illustrations in respect thereof in the drawings. That is to say that: the scanner longitudinal axis $x_S$ coincides with the row axis $x_K$, the centre axis $y_S$ coincides with the optical axis $y_K$ and the scanning axis $z_S$ coincides with the column axis $z_K$ of the camera 3. The alignment of the measuring device 6 and thus of the laser scanner 1 is accordingly explained on the basis of the scanner coordinate system introduced.

The spatial coordinate system is a spatially fixed, rectangular Cartesian coordinate system having a coordinate origin at the installation location of the laser scanner 1. It has a roadway longitudinal axis $x_R$, which runs in the direction of travel parallel to the course of the roadway margin 2.1, and a roadway transverse axis $y_R$ arranged at right angles with respect thereto. These two axes together lie in the roadway surface 2.2 assumed to be a plane. The third axis of the spatial coordinate system is formed by a normal axis $z_R$ perpendicular to the roadway surface 2.2.

In the case of an empirical installation of the measuring device 6 and thus of the laser scanner 1 at an unknown installation height h at a perpendicular installation distance a alongside the roadway 2, the scanner coordinate system is situated in a manner randomly inclined and rotated relative to the spatial coordinate system. It is then intended to be brought into a defined position with respect to the spatial coordinate system.

Before the method according to the invention begins, the measuring device 6 and thus the laser scanner 1 is preadjusted, that is to say that it is aligned in such a way that the rolling angle is equal to zero or eliminated. This can be carried out by means of one of the known methods e.g. in accordance with EP 2 105 761 B1 cited above or by means of the camera 3, e.g. in accordance with DE 10 2011 050 659 B4 cited above.

As illustrated in FIGS. 1a, 1b and 1c, after this preadjustment the scanner longitudinal axis $x_S$ runs parallel to the roadway surface 2.2, as a result of which a random rolling angle is eliminated or equal to zero. The centre axis $y_S$ forms a random azimuth angle $\beta_z$ with the roadway margin 2.1 (see FIG. 1c) and a random pitching angle $\phi_z$ with the roadway surface 2.2 (see FIG. 1b). That is to say that the scanning plane 1.2 is inclined relative to the roadway surface 2.2 by a random pitching angle $\phi_z$, which can also be zero.

By means of the method according to the invention, the centre axis $y_S$ is then intended to be aligned firstly at a horizontal, predefined acute azimuth angle $\beta_v$ with respect to the roadway margin 2.1 and secondly at a vertical pitching angle $\phi_A$ of greater than/equal to 0° with respect to the roadway surface 2.2, said pitching angle being dependent on the unknown installation height h to be determined.

The method according to the invention is based on the knowledge, also used in the method in accordance with DE 10 2011 050 659 B4 cited above, that a natural horizon line is imaged in an image of an object field on the receiver matrix, hereinafter camera image 7, in a manner dividing the latter transversely, if the row axis of the receiver matrix of the camera 3 is aligned horizontally. It is imaged in a manner transversely dividing the camera image 7 exactly centrally if the optical axis $y_K$ of the camera 3 is also aligned horizontally. This effect is independent of whether or not the horizon is actually visible.

Therefore, if rectilinear edges running parallel in the object field of the camera 3, such as roadway margins, marking lines between the lanes of the roadway 2 or body edges of crash barriers, are imaged in a camera image 7, then these imaged edges intersect at a vanishing point which lies on the imaged horizon line or on an imaginary extension of the imaged horizon line laterally beyond the camera image 7.

The vanishing point lies at the midpoint of the camera image 7 exactly when the camera 3 is aligned horizontally and with the optical axis $y_K$ parallel to said parallel straight lines, that is to say that the optical axis $y_K$ runs in the same direction as the roadway longitudinal axis $x_R$.

The invention makes use of this knowledge by forming a road model 4 from a multiplicity of straight lines 4.2 running towards an intersection point 4.1 and by projecting it onto a display 5 on which the camera image 7 is inserted.

In this case, the road model 4 need not necessarily itself comprise the intersection point 4.1.

Usually, the camera image 7 is transformed into the display 5 such that the boundaries of the display 5 run parallel to the row and column axes $x_K$, $z_K$ of the receiver matrix of the camera 3. The midpoint of the receiver matrix is then identical to the midpoint of the camera image 7, which is transformed into the midpoint of the display 5.

The road model 4 simulates, by means of the straight lines 4.2, edges that are parallel to the roadway margin and are visible in the object field, and, by means of the intersection point 4.1, the vanishing point at which said edges or extensions of said edges apparently converge at the horizon.

Figure 1D:
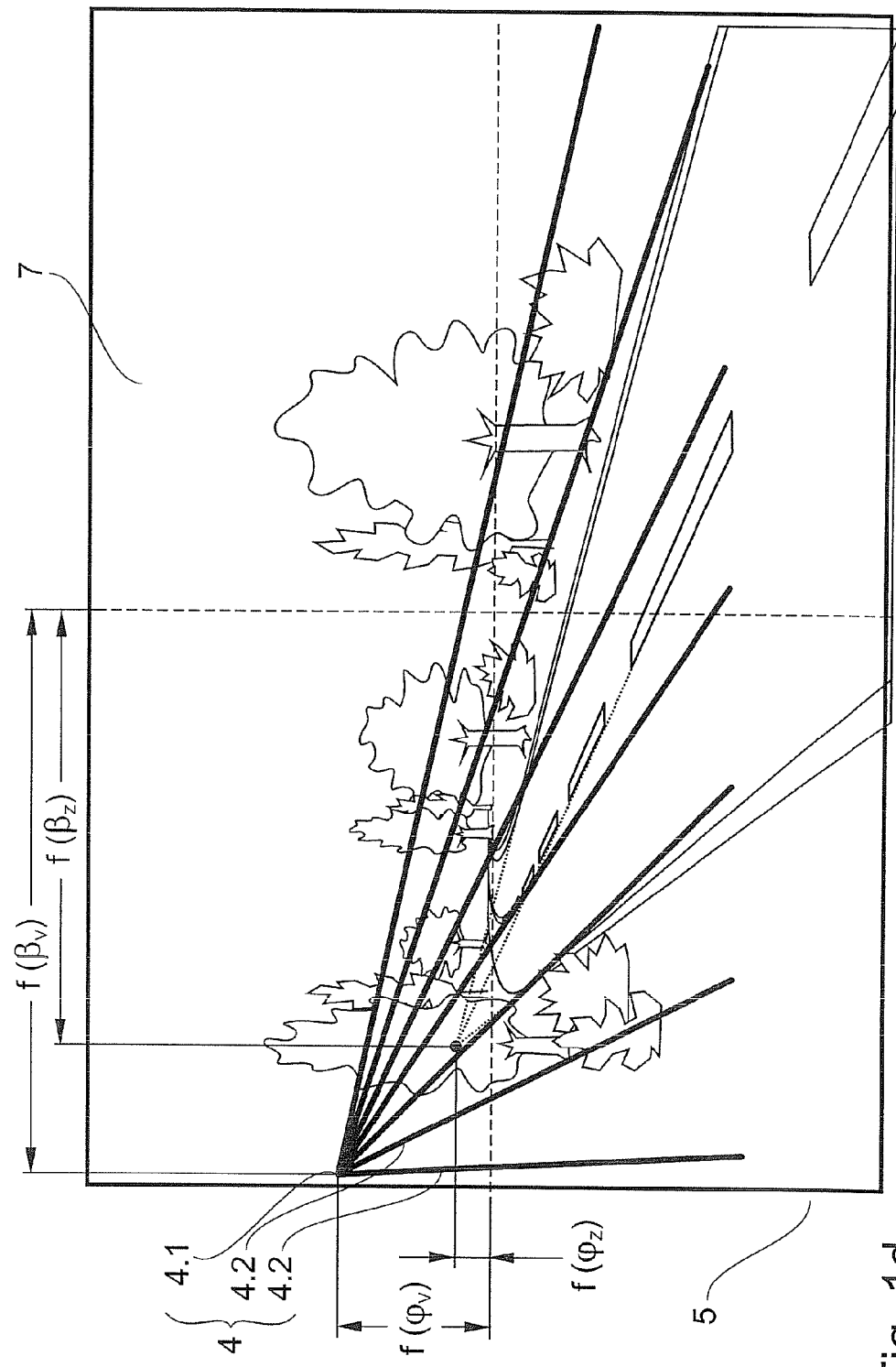

By virtue of the fact that the road model 4 is projected into the display 5 such that the intersection point 4.1 deviates in its position from the midpoint of the display 5 in the direction of the row axis $x_K$ and in the direction of the column axis $z_K$, said intersection point simulates a natural vanishing point such as arises if the optical axis $y_K$ forms a pitching angle of greater than zero with the roadway surface 2.2 and an azimuth angle of greater than zero with the roadway margin 2.1. That is to say that the positional deviations from the midpoint are a known function of the pitching angle $f(\phi)$ and a known function of the azimuth angle $f(\beta)$, as indicated in FIG. 1d.

Aligning the camera 3 and thus the measuring device 6 with respect to the roadway 2 such that it forms a predefined azimuth angle $\beta_v$ and a pitching angle $\phi_A$ dependent on the installation height h requires two adjusting steps.

As the result of the first adjusting step, a predefined azimuth angle $\beta_v$ is set and the installation height h is known. The latter is used to set a pitching angle $\phi_A$ in a second adjusting step, said pitching angle being assigned to said installation height h and thus being dependent on the installation height h.

In the first adjusting step, a camera image 7 is generated by means of the camera 3, which together with the measuring device 6, as already explained, is aligned in a preadjusted position, and said camera image is represented on the display 5. The road model 4 is projected, as shown in FIG. 1d, into the display 5 with intersection point 4.1 at a first predefined relative position with respect to the midpoint thereof. The relative position of the intersection point 4.1 with respect to the midpoint of the display 5 was calculated beforehand in a manner dependent on a predefined azimuth angle $\beta_v$, a predefined pitching angle $\phi_v$ and the intrinsic parameters of the camera 3.

Since the random pitching angle $\phi$, is not equal to the predefined pitching angle $\phi_v$ and the random azimuth angle $\beta$, is not equal to the predefined azimuth angle $\beta_v$, the images of the relevant parallel edges in the camera image 7 and the straight lines 4.2 of the road model 4 do not overlap.

The measuring device 6 is now thus inclined about the scanning axis $z_S$ and the scanner longitudinal axis $x_S$, as a result of which the camera image 7, which continues to be inserted into the display 5, rotates and shifts until the images of the edges that run parallel to the roadway margin 2.1 and are visible in the object field, such as can be seen on roadway markings, edges of kerbs or crash barriers, in the camera image 7 are made congruent with the straight lines 4.2 of the road model 4 as much as possible, in the sense that the edges run towards the vanishing point of the inserted road model 4. Often the edges mentioned are rectilinear only in sections, for which reason the images of these sections are selected in order to make the camera image 7 congruent with the road model 4. In this case, the camera image 7 can advantageously be zoomed digitally on the display 5 in order thus to magnify the images of suitable sections and to improve the accuracy of the overlap.

Advantageously, imaged edges or edge segments are identified in an automated manner and highlighted by means of colour superimposition.

The identification of the edges can be carried out, after an edge detection filter has been applied to the camera image, by means of known methods for line detection, e.g. by means of Hough transformation. In this case, the identified edges (lines) or edge segments can advantageously be filtered depending on the known position of the intersection point 4.1.

The centre axis $y_S$ and thus the measuring device 6 is then already arranged in a manner inclined with respect to the roadway margin 2.1 by the predefined horizontal azimuth angle $\beta_v$. The centre axis $y_S$ forms the predefined pitching angle $\phi_v$ with the roadway surface 2.2. Said angle is chosen with a magnitude such that the centre axis $y_S$ impinges on the roadway surface 2.2 at a distance from which a reflected signal can still be reliably detected by the measuring device 6.

Figure 2A:
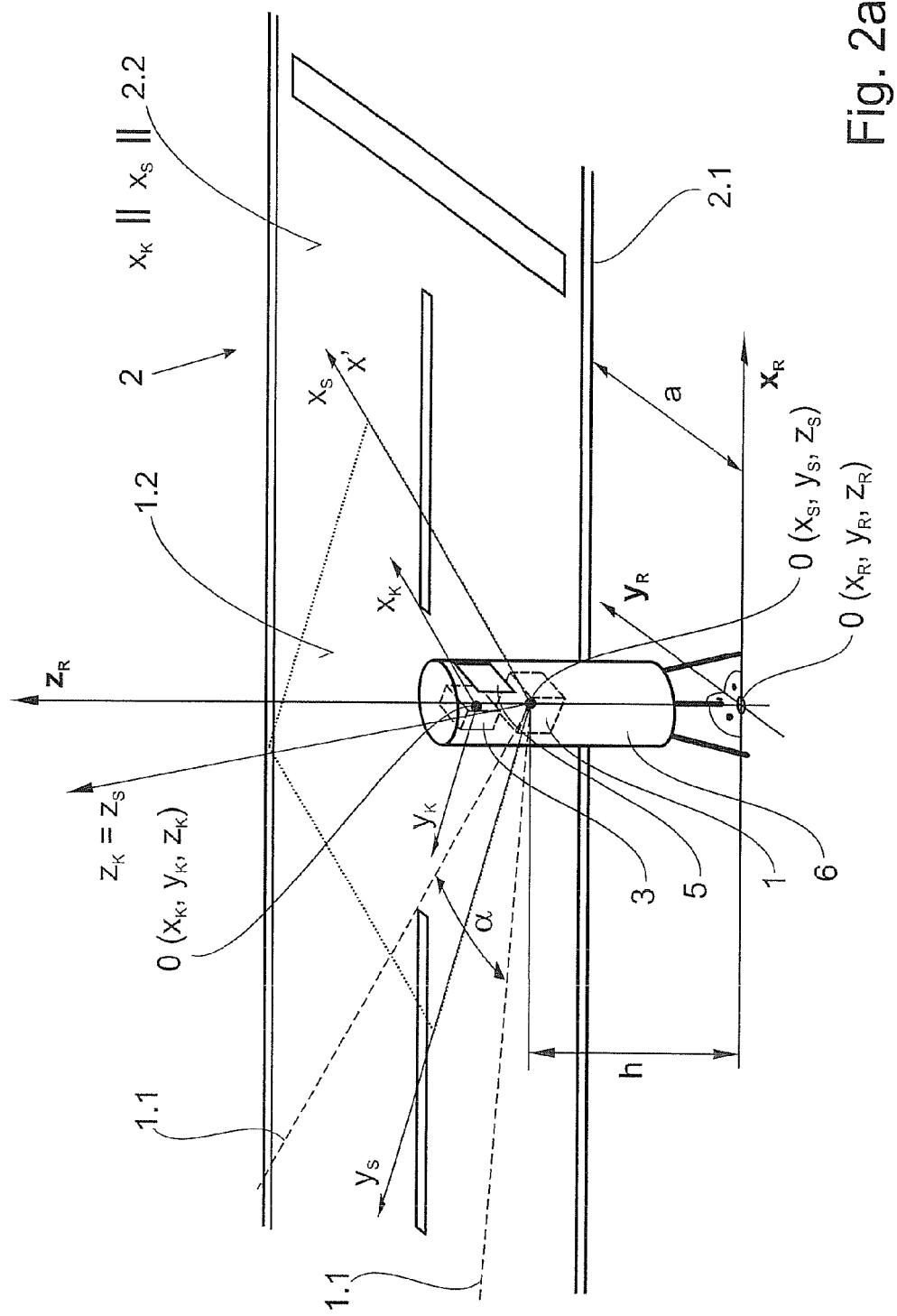
FIG. 2a shows a perspective view of a measuring device aligned with respect to the roadway at a predefined azimuth angle and a predefined pitching angle.
Figure 2C:
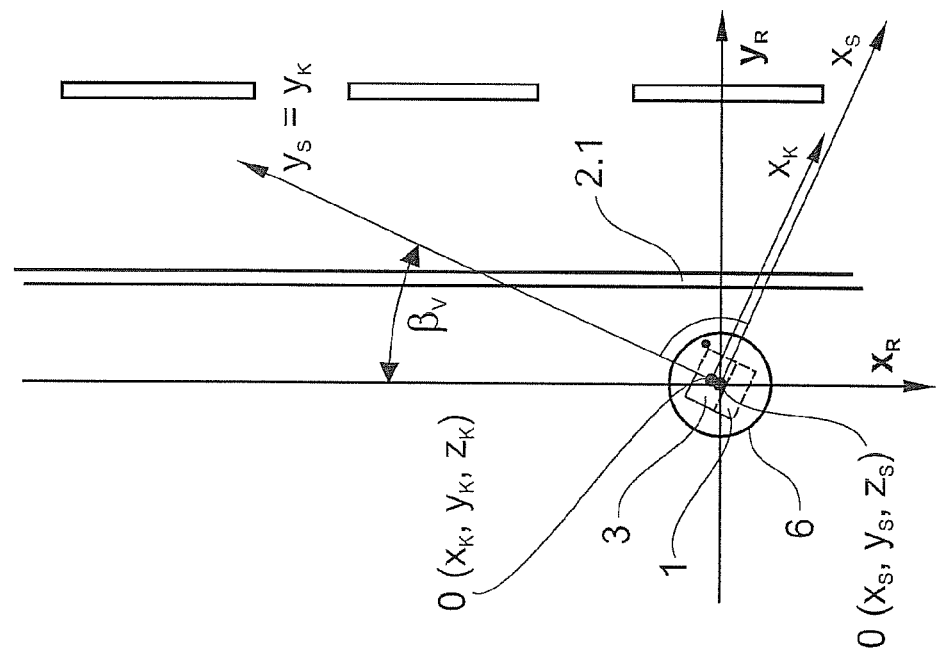
FIG. 2b shows a side view of a measuring device aligned in accordance with FIG. 2a, FIG. 2c shows a plan view of a measuring device aligned in accordance with FIG. 2a, FIG. 2d shows a display with a representation of a camera recording with a measuring device aligned in accordance with FIG. 2a, superimposed by a road model in a first relative position.
Figure 2B:
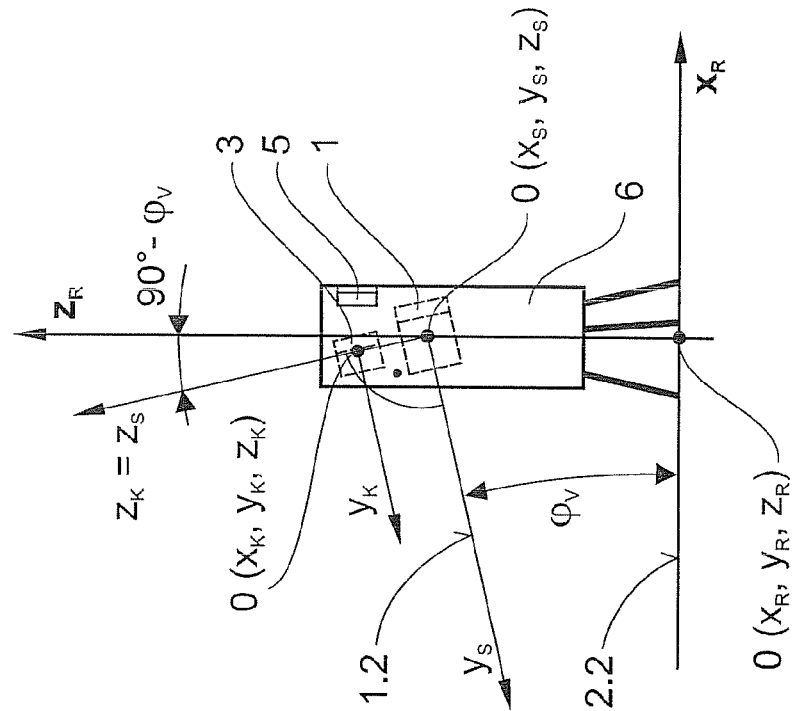

FIGS. 2a, 2b and 2c illustrate the alignment of the measuring device 6 with respect to the roadway 2 after the first adjusting step. FIG. 2d shows the display 5 with the camera image 7, generated with this alignment of the measuring device 6.

The measuring device 6 is then activated and the distance between the impingement point of the laser beam and the measuring device 6 is calculated from the measured values of a laser beam that is emitted along the centre axis $y_S$ and reflected at the roadway surface 2.2, by means of a pulse time-of-flight measurement. From the distance and the known predefined pitching angle $\phi_v$, the installation height h is subsequently calculated by means of the trigonometrical functions in a right-angled triangle.

In order to set up the optimum pitching angle for the measurement range, for each possible installation height h a previously ascertained pitching angle $\phi_A$ assigned thereto and dependent on the installation height h is stored, at which angle the measurement range occupies a relative position optimized in relation to the roadway surface 2.2.

It is assumed here that a known installation distance a that is constant within a negligible tolerance is complied with when the measuring device 6 is arranged alongside the roadway 2. Said installation distance was taken into consideration in the determination of the pitching angle $\phi_A$ dependent on the installation height h, in the same way as the predefined azimuth angle $\beta_v$. If a greater variation is also intended to be permitted for the installation distance a, then pitching angles $\phi_A$ dependent on the installation height h and on the installation distance a are stored. In order then to select the optimum dependent pitching angle $\phi_A$, the installation distance a must then also be known. In comparison with the installation height h, said installation distance can be ascertained trivially and reliably in a simple manner e.g. using a tape measure.

After the selection of a dependent pitching angle $\phi_A$ assigned to the calculated installation height h, a new relative position of the intersection point 4.1 of the road model 4 with respect to the midpoint of the display 5 is determined, said position then simulating a vanishing point if the measuring device 6 is set up at the dependent pitching angle $\phi_A$ and the predefined azimuth angle $\beta_v$.

The second adjusting step involves shifting the projection of the road model 4 with this relative position of the intersection point 4.1 with respect to the midpoint, which position is occupied by the image of the real vanishing point even if the dependent pitching angle $\phi_A$ is set for the centre axis $y_S$ and thus for the measuring device 6.

Finally, the measuring device 6 and thus the centre axis $y_S$ is tilted again about the scanner longitudinal axis $x_S$ until the images of the relevant edges in the camera image 7 are made congruent with the road model 4 again as much as possible. The measuring device 6 is now aligned with respect to the roadway 2 such that its measurement range occupies a known optimum relative position with respect to the roadway 2.

Figure 3:
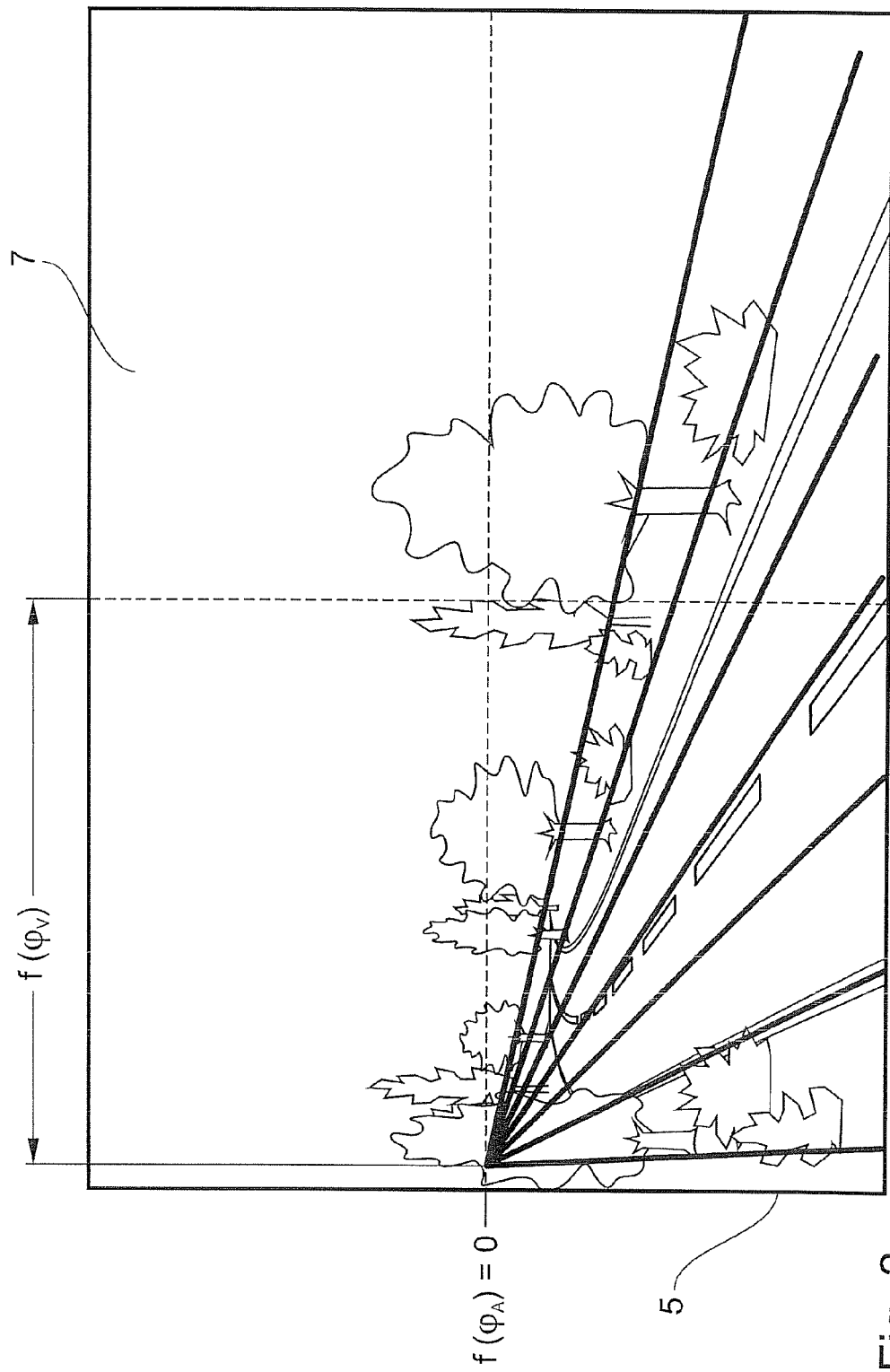
FIG. 3 shows a display with a representation of a camera recording with a finally aligned measuring device, here by way of example with a dependent pitching angle of 0°, superimposed by the road model in a second relative position.

In this respect FIG. 3 illustrates by way of example the display 5 with the camera image 7 and the road model 4, in the case of a set dependent pitching angle $\phi_A$ of 0°.

The method allows an uncomplicated and reliable alignment of a measuring device 6 comprising a laser scanner 1 and a camera 3 with respect to the roadway 2 and is suitable in particular for mobile measuring devices 6. It is almost self-explanatory to the operator and requires neither a special qualification for the operating personnel nor a high expenditure of time.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for aligning a measuring device installed alongside a roadway at an unknown installation height, the measuring device comprising a laser scanner, a camera fixedly assigned to the laser scanner, and a display, wherein the laser scanner defines a Cartesian rectangular scanner coordinate system having a scanning axis, a scanner longitudinal axis and a centre axis, wherein the camera defines a Cartesian rectangular camera coordinate system having a row axis, an optical axis, and a column axis, wherein the row axis is aligned parallel to the scanner longitudinal axis, the optical axis is aligned parallel to the centre axis, and the column axis is aligned in alignment with respect to the scanning axis, and wherein the measuring device is installed with respect to the roadway such that the scanner longitudinal axis lies in a plane substantially parallel to a roadway surface of the roadway, the method comprising:
visualizing a camera image from the camera on the display and projecting a road model having a plurality of straight lines running towards an intersection point onto the display, the intersection point coinciding with a natural vanishing point of images of a roadway margin of the roadway and edges parallel thereto if the measuring device is aligned with respect to the roadway such that the centre axis forms a predefined azimuth angle with the roadway margin and a predefined pitching angle with the roadway surface, the predefined pitching angle having a magnitude such that the centre axis impinges on the roadway surface;
inclining the measuring device about the scanning axis and the scanner longitudinal axis as a result of which the camera image rotates and shifts on the display, until the images of the roadway margin and edges parallel thereto are in alignment at the intersection point, as a result of which the centre axis forms the predefined azimuth angle with the roadway margin and the predefined pitching angle with the roadway surface;
emitting a laser beam via the laser scanner;
calculating a distance between an impingement point of the laser beam on the roadway surface and the measuring device via a pulse time-of-flight measurement;
calculating an installation height from the calculated distance and the predefined pitching angle;
selecting a previously ascertained dependent pitching angle assigned to the calculated installation height;
shifting the road model on the display, wherein the intersection point coincides with the natural vanishing point of the images of the roadway margin and of the edges parallel thereto if the measuring device is aligned with respect to the roadway such that the centre axis forms the predefined azimuth angle with the roadway margin and the dependent pitching angle with the roadway surface; and
inclining the measuring device about the scanner longitudinal axis, as a result of which the camera image shifts on the display until the images of the roadway margin and of the edges parallel thereto are in alignment at the intersection point, as a result of which the centre axis forms the predefined azimuth angle with the roadway margin and the dependent pitching angle with the roadway surface, as a result of which the measuring device is aligned.

2. A method for aligning a measuring device installed alongside a roadway at an unknown installation height, the method comprising:
- visualizing a camera image from the camera on the display and projecting a road model having a plurality of straight lines running towards an intersection point onto the display, the intersection point coinciding with a natural vanishing point of images of a roadway margin of the roadway and edges parallel thereto if the measuring device is aligned with respect to the roadway such that a centre axis forms a predefined azimuth angle with the roadway margin and a predefined pitching angle with the roadway surface;
- inclining the measuring device about the scanning axis and the scanner longitudinal axis as a result of which the camera image rotates and shifts on the display until the images of the roadway margin and edges parallel thereto are in alignment at an intersection point, as a result of which the centre axis forms the predefined azimuth angle with the roadway margin and the predefined pitching angle with the roadway surface;
- emitting a laser beam via the laser scanner;
- calculating a distance between an impingement point of the laser beam on the roadway surface and the measuring device via a pulse time-of-flight measurement;
- calculating an installation height from the calculated distance and the predefined pitching angle;
- selecting a previously ascertained dependent pitching angle assigned to the calculated installation height;
- shifting the road model on the display, wherein the intersection point coincides with the natural vanishing point of the images of the roadway margin and of the edges parallel thereto if the measuring device is aligned with respect to the roadway such that the centre axis forms the predefined azimuth angle with the roadway margin and the dependent pitching angle with the roadway surface; and
- inclining the measuring device about the scanner longitudinal axis, as a result of which the camera image shifts on the display until the images of the roadway margin and of the edges parallel thereto are in alignment at the intersection point, as a result of which the centre axis forms the predefined azimuth angle with the roadway margin and the dependent pitching angle with the roadway surface, as a result of which the measuring device is aligned.

3. The method according to claim 2, wherein the measuring device comprises:
- a laser scanner;
- a camera fixedly assigned to the laser scanner; and
- a display,
- wherein the laser scanner defines a Cartesian rectangular scanner coordinate system having a scanning axis, a scanner longitudinal axis and a centre axis,
- wherein the camera defines a Cartesian rectangular camera coordinate system having a row axis, an optical axis, and a column axis.

4. The method according to claim 3, wherein the row axis is aligned parallel to the scanner longitudinal axis, the optical axis is aligned parallel to the centre axis, and the column axis is aligned in alignment with respect to the scanning axis.

5. The method according to claim 3, wherein the measuring device is installed with respect to the roadway such that the scanner longitudinal axis lies in a plane substantially parallel to a roadway surface of the roadway.

6. The method according to claim 2, wherein the predefined pitching angle has a magnitude such that the centre axis impinges on the roadway surface.

* * * * *